(12) United States Patent
Menard et al.

(10) Patent No.: US 11,173,410 B2
(45) Date of Patent: Nov. 16, 2021

(54) MULTI-PLATFORM VIBRO-KINETIC SYSTEM

(71) Applicant: D-BOX TECHNOLOGIES INC., Longueuil (CA)

(72) Inventors: Jean-François Menard, Longueuil (CA); Robert Desautels, Longueuil (CA); Philippe Roy, Saint-Bruno-de-Montarville (CA)

(73) Assignee: D-BOX TECHNOLOGIES INC., Longueuil (CA)

( * ) Notice: Subject to any disclaimer, the term of this patent is extended or adjusted under 35 U.S.C. 154(b) by 0 days.

(21) Appl. No.: 17/052,002

(22) PCT Filed: May 1, 2019

(86) PCT No.: PCT/CA2019/050571
§ 371 (c)(1),
(2) Date: Oct. 30, 2020

(87) PCT Pub. No.: WO2019/210415
PCT Pub. Date: Nov. 7, 2019

(65) Prior Publication Data
US 2021/0197095 A1 Jul. 1, 2021

Related U.S. Application Data

(60) Provisional application No. 62/665,122, filed on May 1, 2018.

(51) Int. Cl.
*A63G 31/16* (2006.01)
*A63G 31/02* (2006.01)
*A63J 5/00* (2006.01)
*A63J 25/00* (2009.01)

(52) U.S. Cl.
CPC ............. *A63G 31/16* (2013.01); *A63G 31/02* (2013.01); *A63J 5/00* (2013.01); *A63J 25/00* (2013.01); *A63J 2005/002* (2013.01); *A63J 2005/003* (2013.01)

(58) Field of Classification Search
CPC ....... A63G 31/00; A63G 31/16; G06T 19/006
USPC .................. 472/59, 60, 61, 130; 434/29, 55
See application file for complete search history.

(56) References Cited

U.S. PATENT DOCUMENTS

| | | | |
|---|---|---|---|
| 8,707,216 B2 | 4/2014 | Wilson | |
| 8,984,685 B2 | 3/2015 | Robertson et al. | |
| 2020/0215442 A1* | 7/2020 | Leiba | A63G 31/00 |
| 2021/0201914 A1* | 7/2021 | Gagne | G06K 9/0063 |

FOREIGN PATENT DOCUMENTS

| | | |
|---|---|---|
| CN | 102728065 A | 10/2012 |
| CN | 103049007 A | 4/2013 |

* cited by examiner

*Primary Examiner* — Kien T Nguyen
(74) *Attorney, Agent, or Firm* — Norton Rose Fulbright Canada LLP (57) ABSTRACT

A multi-platform vibro-kinetic system comprises a plurality of motion platforms each having actuators to be displaceable to produce vibro-kinetic effects. The system may obtain movements of one or more operator(s), interpret the movements of the operator and identifying from the movements an operator instruction for effect generation, and output a motion signal containing instructions for producing a vibro-kinetic effect on at least one of the motion platforms as a response to the operator instruction.

20 Claims, 3 Drawing Sheets

MULTI-PLATFORM VIBRO-KINETIC SYSTEM

CROSS-REFERENCE TO RELATED APPLICATION

The present application claims the priority of U.S. Patent Application No. 62/665,122, filed on May 1, 2018, and incorporated herein by reference.

FIELD OF THE APPLICATION

The present application relates to motion simulators performing vibro-kinetic effects in synchronization with a video output, an audio output and/or a live event.

BACKGROUND OF THE ART

Motion simulators performing vibro-kinetic effects are commonly used to enhance a viewing experience of a video program. In such technology, a motion simulator features a seat or platform that is displaced by actuators according to vibro-kinetic effects in synchronization with an audio-visual program or visual event. In a particular type of such motion simulators, the motion simulators move based on motion signals that are encoded as a motion track, in contrast to vibrations being extracted from a soundtrack of an audio-visual program.

It would be desirable to use vibro-kinetic effects or like motions of platforms to other types of entertainment, including live shows and on-scene performances. Yet, vibro-kinetic effects are often based on motion tracks encoded as a function of video program.

SUMMARY OF THE DISCLOSURE

Therefore, in accordance with a first embodiment of the present disclosure, there is provided a system for actuating motion platforms of a multi-platform vibro-kinetic system comprising: a processing unit; and a non-transitory computer-readable memory communicatively coupled to the processing unit and comprising computer-readable program instructions executable by the processing unit for: obtaining movements of at least one operator, interpreting the movements of the operator and identifying from the movements an operator instruction for effect generation, and outputting a motion signal containing instructions for producing a vibro-kinetic effect on at least one of the motion platforms as a response to the operator instruction.

Further in accordance with the first embodiment, obtaining movements of at least one operator includes for example obtaining a stream of a three-dimensional model representation of an operator.

Still further in accordance with the first embodiment, obtaining movements of the operator includes for example capturing the movements from at least one motion sensing input device.

Still further in accordance with the first embodiment, obtaining movements of the operator includes for example generating the three-dimensional model representation of the operator.

Still further in accordance with the first embodiment, interpreting the movements of the operator includes for example obtaining a motion sample as a function of an interpreted type of the movements.

Still further in accordance with the first embodiment, outputting a motion signal includes for example obtaining the motion sample from a database matching motion samples with interpreted types of movements.

Still further in accordance with the first embodiment, interpreting the movements of the operator includes for example quantifying the movements of the operator, and wherein outputting the motion signal includes for example producing the vibro-kinetic effect proportional to the quantifying of the movements.

Still further in accordance with the first embodiment, quantifying the movements of the operator is triggered by interpreting at least one of movements as a trigger for the quantifying.

Still further in accordance with the first embodiment, producing the vibro-kinetic effect proportional to the quantifying of the movements includes for example adjusting one or more of an amplitude, a frequency, and a distance of the motion platform.

Still further in accordance with the first embodiment, identifying from the movements an operator instruction for effect generation includes for example identifying from the movements a zone of the motion platforms to which the motion signal is output as a response to the operator instruction, while motion platforms outside the zone are not actuated as a response to the operator instruction.

Still further in accordance with the first embodiment, identifying the zone of the motion platforms includes for example interpreting a direction of a pointing limb of the operator to identify the zone.

Still further in accordance with the first embodiment, outputting the motion signal includes for example outputting the motion signal to a plurality of the motion platform and wherein outputting the motion signal includes for example adding a timed delay to neighbor ones of the motion platforms as a function of a physical distance between the seats.

Still further in accordance with the first embodiment, adding a timed delay includes for example adding a timed delay of 300 ms to 700 ms per meter.

Still further in accordance with the first embodiment, a motion signal track is for example to a plurality of the motion platforms while outputting the motion signal as a response to the operator instruction.

Still further in accordance with the first embodiment, outputting the motion signal track is output for example in synchronicity with an audio track and/or a video track.

Still further in accordance with the first embodiment, outputting the motion signal as a response to the operator instruction supersedes or supplements for example the outputting of the motion signal track.

Still further in accordance with the first embodiment, actuators of the at least one motion platform are actuated for example with the motion signal to produce the vibro-kinetic effect.

Still further in accordance with the first embodiment, actuating the actuators includes for example actuating the actuators at a frequency spectral content of 0-200 Hz.

In accordance with a second embodiment of the present disclosure, there is provided a multi-platform vibro-kinetic system comprising: a plurality of motion platforms each having actuators to be displaceable to produce vibro-kinetic effects; the system according as described above for actuating the motion platforms.

Further in accordance with the second embodiment, at least one motion sensing input device is provided for example for capturing movements of the operator.

Still further in accordance with the second embodiment, a screen for example displays a video content.

In accordance with a third embodiment of the present disclosure, there is provided a method for actuating motion platforms of a multi-platform vibro-kinetic system comprising: obtaining a stream of a three-dimensional model representation of an operator; monitoring the stream and interpreting at least one movement of the operator from the stream as a manual instruction for effect generation; and outputting a motion signal containing instructions for producing a vibro-kinetic effect on at least one of the motion platforms.

DESCRIPTION OF THE EMBODIMENTS

Figure 1:
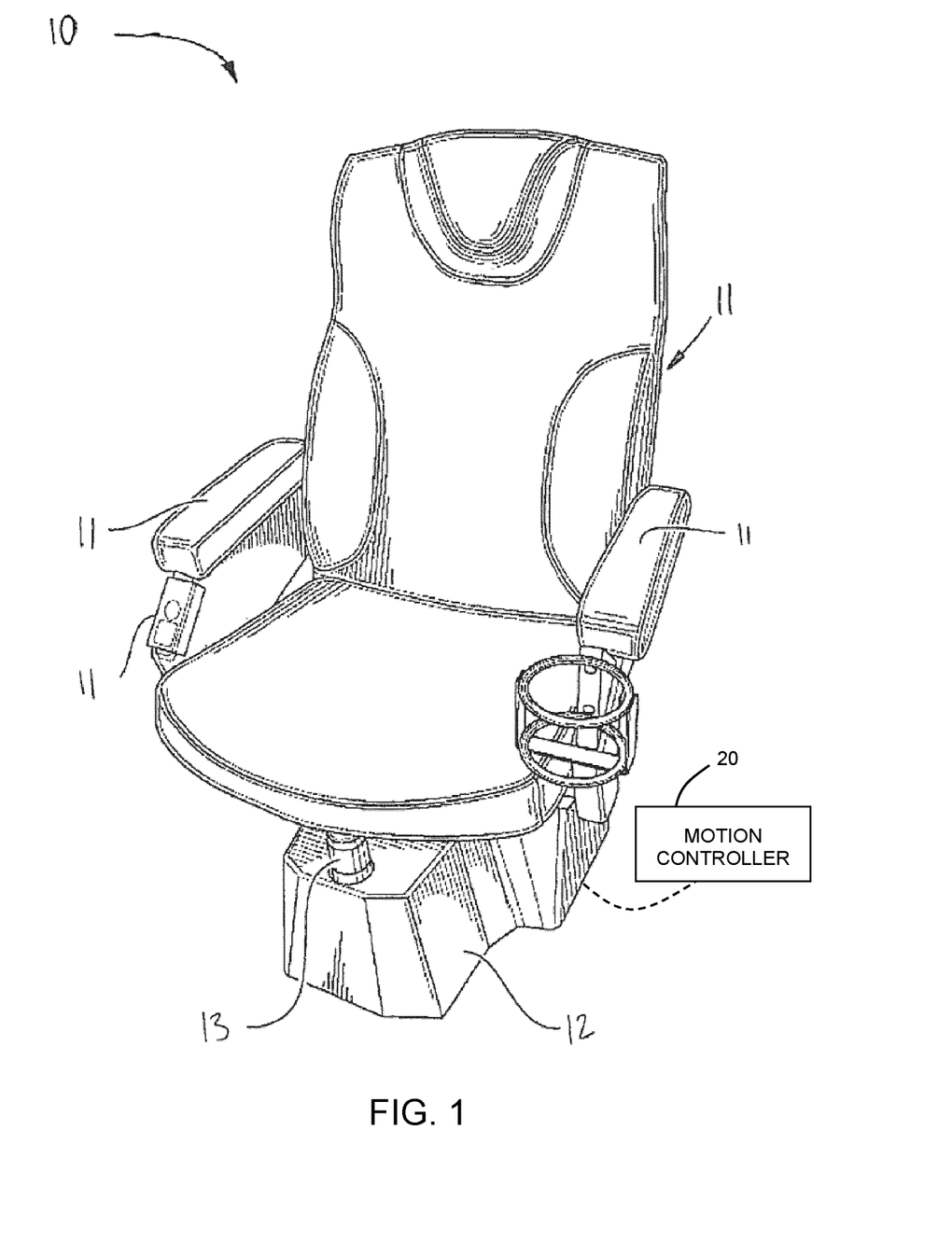
FIG. 1 is a perspective view of an embodiment of a motion platform actuated to produce vibro-kinetic effects in accordance with the present disclosure.

Referring to the drawings, and more particularly to FIG. 1, there is illustrated at 10 a motion platform outputting vibro-kinetic effects in synchronization with a video output, an audio output and/or a live event. By way of example, the motion platform 10 may include a motion simulator, with motion platform and motion simulator used interchangeably. The motion simulator is of the type that receives actuation signals so as to move an output thereof in accordance with a set of movements. The actuation signals may be known as motion signal, motion samples, motion code, motion commands, and are representative of movements to be performed being received from a controller. In the illustrated embodiment, the motion simulator has a seat having a seat portion 11 in which a user(s) may be seated. Other occupant supporting structures may be included, such as a platform, but for simplicity the expression seat portion 11 will be used in the present application.

The seat portion 11 is shown as having armrests, a seat, and a backrest and this is one of numerous configurations considered, as the seat portion 11 could be for a single user, multiple users, may be a bench, etc, (e.g., no armrest and/or no backrest). The motion simulator also has an actuation system 12 by which the output, namely the seat portion 11, is supported to the ground. The actuation system 12 is shown as having a casing hiding its various components, although a linear actuator 13 is partly visible. The actuation system may have one or more of these linear actuators 13, supporting the output, i.e., the seat portion 11, from the ground. The seat portion 11 may also be supported by a seat leg, column or post with or without passive joint(s) in parallel arrangement with the linear actuator(s) 13. In an embodiment, the linear actuator 13 is an electro-mechanical actuator of the type having a ball-screw system, although other types of linear actuators may be used. For example, a single one of the linear actuators 13 can produce up and down motion and vibrations. A pair of the linear actuators 13 can produce two of up and down motion, pitch motion or roll motion, with or without a passive joint. Three linear actuators 13 can produce up and down motion, pitch motion and roll motion. The motion simulator 10 of FIG. 1 is one among numerous possible configurations for the motion simulator 10. For example, the motion simulator 10 may support a platform or structure instead of a seat portion, in a flight simulator embodiment, or an end effector in the case of a parallel manipulator or like robotic application. The motion simulator may include the necessary electronics to receive a digital signal with motion content (referred to as motion signal) to drive the actuation system 12 in performing movements in synchronization with an audio or video output or a virtual reality session, as described hereinafter. Stated differently, the motion simulator may have a local driver to convert the motion signal into a powering of the linear actuators 13 to produce the desired vibro-kinetic effect. The motion platform 10 may also include various sensors to quantify the movements of the seat portion 11 (e.g., acceleration, speed, load) and to quantify the load resulting from the presence of a user (e.g., weight of the user, weight spread on the seat portion 11, etc). The sensors may include any one of inertial sensors (e.g., accelerometer, gyroscope), thermocouples, load cells, pressure sensors, among others.

For context, vibro-kinetic effects refers to vibrations and/or displacements performed by a motion platform and presented to a user as a sensory feedback. By way of non-limiting example, the vibro-kinetic effects may be low amplitude reciprocate movements or vibrations, from 1 micron to 200 mm. The vibro-kinetic effects may have a low frequency spectral content, such as 0-5 Hz, 20-100 Hz or 0-200 Hz, and may contain one or more dimension or channel. According to an embodiment, the vibro-kinetic effects are encoded effects, also known as motion samples.

The motion platform 10 may be part of a system featuring a motion controller 20 feeding the motion platform 10 with a motion signal representative of the vibro-kinetic effects to be performed by the motion platform 10. In addition to the example of FIG. 1, the motion platform 10 can take various forms, such as a vibro-kinetic platform for lifting people relative to a structure, a motion platform supporting a seat, a chair with inertial shakers, a portable tactile display for providing haptic feedback, wearable actuators embedded in a vest, etc. Actuators can be of various types, such as linear, rotary, voice coil, resonant, inertial, and the like, and be powered from various source, such as electric (including electromechanical), pneumatic, hydraulic, etc. The motion signal may be output from a motion program or motion track that is programmed based on a viewing of the audio-visual output, and comprises actuator-driving instructions to drive the actuators of the motion platform 10 to perform the programmed vibro-kinetic effects in audio-visual output. Other names for the motion signal may include vibro-kinetic signal, motion code, motion samples, data packets of motion, etc. The motion platform 10 may therefore have a digital signal processor and/or driver in order to convert the motion signal received from the motion controller 20 into signals controlling the movements performed by the actuators to displace the seat or platform of the motion platform 10.

Figure 2:
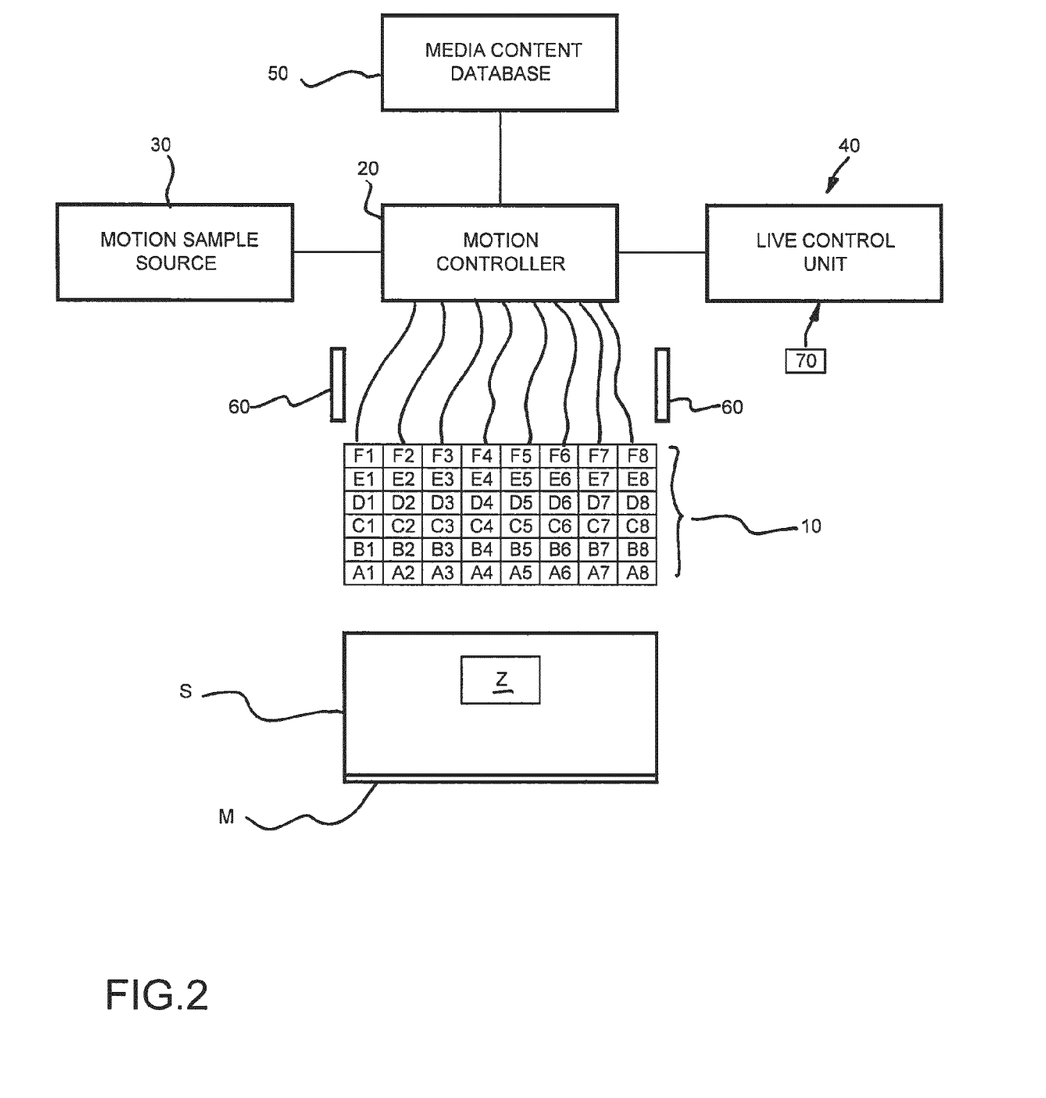
FIG. 2 is a schematic view of a multi-platform vibro-kinetic system in accordance with an embodiment of the present disclosure.

Referring to FIG. 2, a multi-platform vibro-kinetic system is generally shown relative to a theater type facility. The theater type facility may be part of a cinema, an auditorium, stadium, a theater, a hall, i.e., it is configured to host many participants. The facility may have a plurality of seats, at least some of which are motion platforms 10 as described in FIG. 1. In FIG. 2, the motion platforms 10 are shown as an array of motion platforms 10, arranged in a grid. According to an embodiment, all of the seats of the facility are motion platforms 10, though fewer than all seats may be motion platforms 10—some seats may be fixed. For subsequent reference, the motion platforms 10 are shown as being separated in rows A, B, C, D, E and F, with the seats labelled 1 to 8, for a total of 48 motion platforms 10, although fewer or more may be present. Accordingly, the item shown as A2 is seat 2 in row A, etc. When numerous motion platforms 10 are present, the motion controller 20 may be a plurality of motion controllers 20, for instance in a daisy-chain configuration.

The facility may also have a scene S and/or a screen M. According to an embodiment, all seats of the motion platforms 10 are oriented to face the scene S and/or screen M. While all seats are shown in FIG. 2 as being in parallel columns, other seating arrangements are contemplated based on the nature of the facility. For example, the seats may be oriented in a radial configuration relative to the scene S and/or screen M. In yet another embodiment, the scene S may be a central scene S with the seats arranged in an annular array or semi annular array around the scene S. The scene S may have a zone Z at which a comedian, entertainer or other performance artist may stand to face and address the crowd. The screen M may be any type of screen. For example, the screen M may be associated with a projector in a projection room, or may be a giant screen monitor, an array of giant screen monitors, etc. As yet another embodiment, each participant has a personal virtual reality (VR) headset, such as an Oculus® Rift®, or any other type of headset, including smart phones with supportive head gear. In an embodiment, all viewers in the array of seats of FIG. 2 simultaneously watch the same VR content, though each viewer has his/her own VR headset.

Still referring to FIG. 2, the multi-platform vibro-kinetic system may include the motion controller 20, also known as motion controller hub. The motion controller 20 communicates with the motion platforms 10 to actuate them, for the motion platforms 10 to produce vibro-kinetic effects. The connection between the motion controller 20 and the numerous motion platforms 10 may take any appropriate form, some of which are described in U.S. Pat. No. 9,878,264, incorporated herein by reference. For example, arrays of the motion platform 10 may be connected to any one port of the motion controller 20. Moreover, although one motion controller 20 is shown, multiple motion controllers 20 may be present, in the form of various hubs each driving a set of the motion platforms 10.

The motion controller 20 has the capacity of delivering the motion signals to all motion platforms 10 simultaneously. The motion controller 20 also has the capacity of actuating individual motion platforms 10, as each of the motion platforms 10 may have a network address. According to an embodiment, the motion controller 20 may associate a network address to each motion platform 10 connected thereto. The network address can also be provided in order to follow distributions of seats, for example, in the facility. In another embodiment, the motion controller 20 can store the association of the network address of each motion platform 10 in order to define a network topology of the motion platforms 10. In one embodiment, the network address can be any IP address, logical address, numerical identifier, physical address or the like. In yet another embodiment, the network address defines a logical point-to-point association for each motion platform. Alternatively, motion platforms 10 can be managed by the motion controller 20 without using a network address. Also, the motion platforms 10 may receive individual signals by being instructed to listen to a specific channel in a multi-channel signal.

According to an embodiment, a bidirectional control protocol is used, according to which each downstream control port of the motion controller 20 may be a bidirectional link through which the motion controller 20 controls and manages individually each motion platform 10. A unidirectional control protocol may also be used. The motion controller 20 may have the capacity of sending individual and independent client motion signals, namely dedicated motion signals addresses indicative of a motion to be performed by a selected motion platform(s) 10, along with the network address and/or the control data. In contrast, global motion signals may be sent to all motion platforms, i.e., without a network address (or non-seat specific), to drive all motion platforms simultaneously, or with all network addresses.

The bidirectional control protocol may allow each motion platform 10 to return a feedback signal to the motion controller 20. In one embodiment, the feedback signals may comprise the network address identifying the motion platform 10 sending the feedback signal to the motion controller 20. In this embodiment, the network address of each motion platform 10 may be used by the motion controller 20 for management or maintenance purposes by, for example, monitoring specific operating parameters of the individual motion platform 10 such as the temperature of the actuators being used, the weight, or fault information data. By detecting the weight on a motion platform 10, the presence of a user may be confirmed, or how the user is seated. In one embodiment, the motion controller 20 provides commands to control each motion platform 10, for instance to turn the actuation of a platform 10 to an "on" state if a seat is attributed to a user in a movie theatre. In another embodiment, the motion controller 20 adjusts movement parameters as a function of the weight data perceived by the sensors of the motion platforms 10. For example, it may be desired that a child not be exposed to the same accelerations as an adult, and the weight data may be used to adjust the intensity of the movements of the motion platforms 10 based on weight. While the motion controller 20 is described above as centrally providing an intensity based on weight, the weight-based intensity may be controlled locally, with the digital signal processor or driver of the motion platform 10 modulating the effects as a function of the weight. Based on the network address of each motion platform 10, the motion controller 20 manages the motion platforms 10 connected to the hub 10, including start-up, standby and fault management.

According to an embodiment of the control protocol, the motion controller 20 repeatedly seeks feedback from each motion platform 10. For example, if communication is lost with one actuator of a motion platform 10 of the array of FIG. 2 or if a failure of one platform 10 is detected during the motion playback, the driver of the motion platform 10 detects the error and informs the motion controller 20. Based on the type of error, the motion controller 20 may park or freeze the motion platform 10. In another embodiment, the communication between the motion platform 10 and the motion controller 20 is maintained. The motion controller 20 may reactivate the faulty motion platform using commands sent to the motion platform 10. Under given circumstances (when failure is due to high temperature of an actuator for example), the motion controller 20 may resume the motion control of a platform 10 that has failed after a given period of time.

Accordingly, the motion controller 20 may send motion signals to any one or more seats, while not sending and/or addressing motion signals to any other seat, such that the other seats remain still. The motion controller 20 may receive the motion signals from a motion sample source 30. The motion sample source 30 may take different forms. For example, the motion sample source 30 may be a DCP (digital cinema package) in a D-cinema player. The DCP may include a channel or channels dedicated to supporting a motion track of motion samples. The motion track may therefore be the motion signal output synchronously with an audio track and/or a video track contained in the DCP. Accordingly, the audio track and/or the video track are output via loudspeakers and projector in synchronization with the motion track, whereby the motion controller 20 may drive the motion platforms 10 to move in synchronization with the audio and video, by feeding them motion signals.

The motion sample source 30 may also be cloud-based, with motion signals therefrom received by the motion controller 20 for driving the motion platforms 10. Various approaches may be taken by the motion controller 20 to drive the motion platforms 10 in synchronization with a video output or audio output. In accordance with an embodiment, the motion controller 20 may perform or initiate media recognition to synchronize the sending of the motion signal to the motion platforms 10 with the media. The media recognition performed or initiated by the motion controller 20 may be as described in U.S. Pat. No. 9,640,046, incorporated herein by reference. In such a scenario, the motion controller 20 may access a media content database 50, for instance as a cloud-based database, or a database integrated in the motion controller 20 or in another component of the system.

According to another embodiment, the motion sample source 30 provides a motion track that is in synchronization with the media content broadcast to the VR headsets of the viewers. In such an embodiment, different approaches may be used to synchronize the movement of the motion platforms 10 with the media content. For example, PCT Patent Application No. PCT/US2016/062182 describes a method and system for synchronizing vibro-kinetic effects to a virtual reality session, which method may be used to synchronize one of any one of the seats with the VR content. If the VR content is broadcast for simultaneous playback by the VR headsets, the motion controller 20 may perform the synchronization method of PCT Patent Application No. PCT/US2016/062182 with a single one of the VR headsets, to then output the motion signals to all motion platforms 10 based on the synchronization with a single one of the VR headsets, as one possibility among others.

The motion controller 20 may also receive motion code and driving commands from a live control unit 40. While the motion sample source 30 may provide a continuous stream of motion samples, a.k.a., a motion track, the live control unit 40 may be used to punctually drive the motion platforms 10 for example as a controlled by live action commands by an operator in the facility. This may include actuation by the performing artist on scene S, by a director or technician behind the scene S, etc. However, for consistency, reference is made herein to the operator. The driving by the live control unit 40 may be done in alternation with the actuation of the motion platforms 10 by a motion track from the motion sample source 30 described above, i.e., the continuous stream of motion signal with motion samples, or in supplement to it. In accordance with an embodiment, the driving by the live control unit 40 overrides the continuous stream of motion samples.

Figure 3:
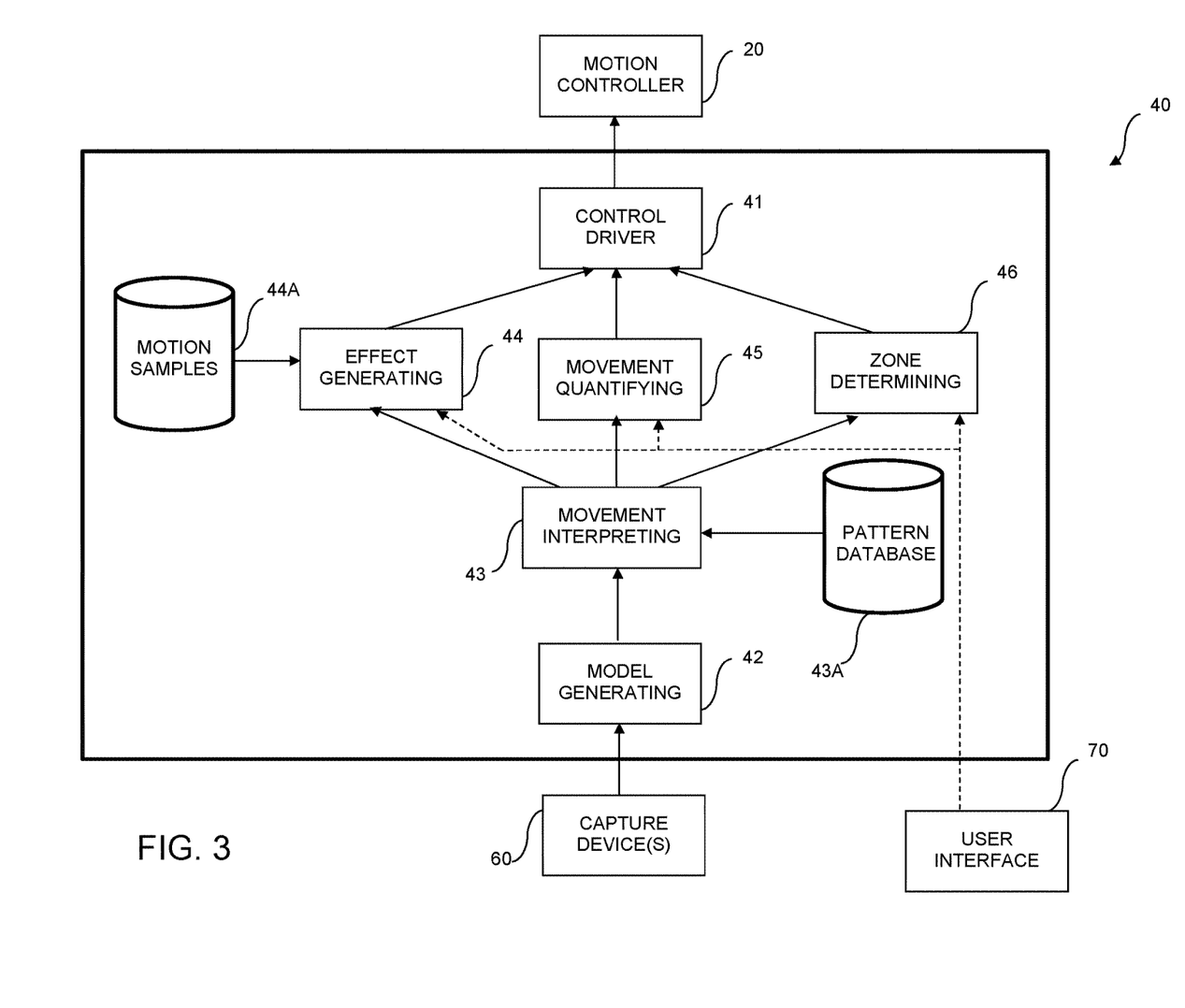
FIG. 3 is a block diagram of a live control unit for the multi-platform vibro-kinetic system of FIG. 2.

Referring to FIG. 3, the live control unit 40 is shown in greater detail. The live control unit 40 may include one or more processors configured to operate modules and software. The live control unit 40 may also include a non-transitory computer-readable memory communicatively coupled to the processor(s) and comprising computer-readable program instructions executable by the processor(s). The various modules and like algorithms defined herein may be such computer-readable program instructions. Moreover, although the motion controller 20 and the live control unit 40 are shown as separate apparatuses, they may both be as part of a same integrated casing, with shared computing, etc. However, for simplicity, the live control unit 40 is described herein as a separate apparatus. The live control unit 40 may operate with one or both of a capture device(s) 60 and a user interface(s) 70.

The capture device(s) 60 may be a 3D capture device for capturing images of an operator. According to an embodiment, the capture device(s) 60 focuses on the zone Z of the scene S, where an operator stands, the operator being in an embodiment the performing artist during a performance. The capture device(s) 60 may be selected to capture 2D footage of the operator, the 2D footage usable to produce a 3D representation of the operator, whose movements may then be interpreted to detect instructions. The capture device(s) 60 may have a processor to output the 3D representation, or the 3D representation may be produced by the live control unit 40 using the data capture by the capture device(s) 60. For example, the capture device 60 includes two different cameras in order to produce the 3D representation by triangulation of the images from the different cameras. The expression capture device 60 is used herein in the singular or plural considering that the two different cameras providing the two points of view for triangulation and depth assessment may be part of a same casing, or of two different casings. In an embodiment, as shown in FIG. 2, there are two capture devices 60, each providing at least one camera and one point of view. The capture devices 60 may also be closer to the scene S, and may even be on the scene S. According to an embodiment, the 3D capture devices 60 are point-cloud capture units, such as the Kinect™ or PrimeSense™. The capture devices 60 may include an infrared source to emit an infrared speckle map to assist in the depth perception, for the subsequent generation of a 3D model of the operator. In an embodiment, the images are infrared speckles forming clouds of points, well suited for indoor use. The images captured by the capture device(s) 60 may include other types of visual data, such as reflective patterns on the operator, etc. The capture device 60 may also include or may also be a motion capture suit, such as a Xsens® motion capture suit.

The interface 70 may be any appropriate handheld device (e.g., pad, smart phone, remote control, joystick, among others) that may be provided for the operator to perform commands related to the actuation of the motion platforms 10, for example as part of the performance. As a handheld device, the interface 70 may have a touchscreen with appropriate command buttons, facility seat disposition (e.g., an array as in FIG. 2) sliders and the likes, provided thereon (e.g., an application on the interface 70).

The live control unit 40 may have a control driver module 41 configured for commanding the motion controller 20. The live control unit 40 may drive the motion controller 20 by sending motion signals with or without network addresses, for the motion controller 20 to actuate the motion platforms 10 based on the commands from the live control unit 40. The motion signals and network addresses may result from the capture or reception of live manual instructions from an operator(s), as detailed below.

In an embodiment, gestures from the operator are detected and serve as live manual instructions. The live control unit 40 may consequently include a model generating module 42, if the capture device(s) 60 does not itself output the 3D model. The model generating module 42 receives the visual data captured by the capture device(s) 60. The visual data may depend on the type of capture devices being used. For example, the visual data may be at least two 2D image streams from separate points of view (i.e., camera footage). With the visual data, the model generating module 42 (whether in the live control unit 40 or in the capture device(s) 60) may generate a 3D image stream from the visual data. Stated differently, triangulation may be used by the model generating module 42 to provide a location in 3D space (X, Y, Z) to points on the objects of the 2D images. With the points, a 3D model of the operator may be generated in the 3D space, in real time or quasi-real time.

With the 3D model of the operator, the live control unit 40 has sufficient resolution to distinguish the various parts of the operator's anatomy, e.g., torso, legs, arms, head. For example, the limbs of the operator project from a torso sufficiently to be recognizable from the resolution of the 3D model. Hence, a movement interpreting module 43 is configured to monitor the 3D model stream or footage to recognize the movements of the operator and interpret the movements as manual instructions. In an embodiment, a pre-show calibration can be done, by which the 2D images from the capture devices 60 and/or the 3D images of the model generating module 42 are displayed for a director or technician to tag or delimit the torso and limbs of an operator or operators. As a consequence, the recognition of the anatomical parts by the movement interpreting module 43 may be facilitated. However, in an embodiment, the live control unit 40 operates without such calibration.

The movement interpreting module 43 may be programmed with movement patterns, for instance in pattern database 43A, with which the movement interpreting module 43 may comparatively detect gestures representing manual instructions. For instance, the movement interpreting module 43 may track a torso and arms of the operator, to identify an arm movement (e.g., raise). In the pattern database 43A, a given orientation of the arm relative to the torso may be regarded as a manual instruction action and hence be identified as such by the movement interpreting module 43. Likewise, an arm or leg pointing to a given zone in the array of seats may be regarded as a manual identification of seats. Depending on the resolution provided by the capture devices 60, more intricate movements, such as finger pointing, may also be detected as manual instructions. Consequently, the movement interpreting module 43 may output an indication, such as pointing arm, raised arm, waving arm, kicking leg, just to name a few of the numerous movements that may be interpreted by the movement interpreting module 43. The output of the movement interpreting module 43 to the other modules may be in any appropriate format, including codes or modes. For example, the movement interpreting module 43 may indicate that the manual instruction is a mode 1 or code 2, with the responsive modules of the live control unit 40 associating mode 1 or code 2 to a specific type of manual instruction. Once the movement interpreting module 43 has interpreted a movement from the operator, different types of actuations may result depending on the nature of the movement. According to an embodiment, an effect generating module 44 may generate a specific effect based on the type of manual instructions. The effect generating module 44 may receive the output of the movement interpreting module 43, and associate the type of movement to a given motion sample. For example, an arm pointing toward the sky, or a kicking leg, as interpreted by the movement interpreting module 43, may prompt the effect generating module 44 to output a given motion sample, such as an up-down movement of the motion platform(s) 10. As another example, for illustrative purposes only, the movement interpreting module 43 may interpret the arms of the operator as projecting laterally from his/her torso, and this may cause the effect generating module 44 to output a motion sample resulting in a roll of the motion platforms 10, provided the motion platforms 10 have a roll capacity. As another example of a motion sample from the motion sample database 44A, the operator may trigger an effect that propagates with a timed delay to neighbor seats, such as a linear/radial wave. For example, the same effect can be played with increasing onset delay from row A to row F (FIG. 2). The effect can be modulated as it is activated between successive rows (crisper in first row, softer in last row, for example), i.e. by changing filter parameters between row triggers. The timed delay to neighbor seats can be dependent on the physical distance between the seats according to a 2D/3D floor plan, e.g. 500 ms delay per meter distance from selected seat B7 (300 ms to 700 ms delay). The effect generating module 44 may therefore be associated with a motion sample database 44A to match motion samples to types of movements detected by the movement interpreting module 43.

Some of the manual instructions may be used by the live control unit 40 to command short duration movements by the motion platform(s) 10 (e.g., milliseconds, or less than a second), or simply movements having a definite duration. Some other types of manual instructions may be used by the live control unit 40 to command movements of indefinite duration by the motion platform(s) 10. For example, a gesture of the operator may manually instruct the live control unit 40 to initiate a given vibration of the motion platforms 10 until the operator ceases the gesture. As another example, the raised arm of the operator can result in a pitch vibration (provided the motion platforms 10 have the physical capacity to produce such movements). The lowering of the arm, after a given amount of time, may end the pitch vibration. In such a scenario, the movement interpreting module 43 would output a continuous movement interpretation to the effect generator module 44, and the latter would continuously output the corresponding motion samples until the ceasing of the movement interpretation.

The live control unit 40 may have a movement quantifying module 45, to quantify the movements from the operator. The quantification of the movements may be used to adjust the parameters of actuation of the motion platforms 10. Such parameters include, for example, amplitude, frequency, distance, etc. For example, an arm of the operator may waive or effect a reciprocating up-down pattern, and the live control unit 40 may adjust a vibration, a stroke, an amplitude of movement actuation of the motion platform 10, to create a movement of the seats 11 of the motion platforms 10 that matches the movements of the operator. The output of the movement quantifying module 45 may be used in conjunction with the output of the effect generating module 44, as the effect generating module 44 outputs the motion samples, and the movement quantifying module 45 quantifies the intensity of the motion samples, i.e., the vibro-kinetic effect produced may be proportional to the quantifying of the movements. Accordingly, the movement quantifying module 45 monitors the output from the movement interpreting module 43 to quantity gesturing movements from the operator. In an embodiment, the movement quantifying module 45 may be triggered to monitor movements only when a specific type of movement is interpreted by the movement interpreting module 43, to avoid unnecessary computing. The output from the movement interpreting module 43 to the movement quantifying module 45 may be of any appropriate form. For instance, the output may have the form of a focused portion or all of the 3D image stream, or it may be distance-based data, such as speed, distance, acceleration, etc, which is then converted by the movement quantifying module 45 in movement quantification to be applied to the motion samples.

The movements may not apply to all of the motion platforms 10, but may instead be limited to a given seat or seats, for example seats of a given zone. A zone determining module 46 may be used to associate a gesture of the operator to an identification of specific seats to be actuated. For example, an arm pointing in a given orientation may be used by the live control unit 40 to indicate that only a given zone of motion platforms 10 are to be actuated. Hence, the zone determining module 46 determines the seats in the array of seats of FIG. 2 that are being pointed. According to an embodiment, the zone determining module 46 performs a projection of the limb onto a grid representative of the 3D space of the facility. Such projection may therefore be based on the orientation of the arm, and the location of the operator on the scene S. Zones may be regrouped in any type of manner, such as all seats 7 and 8 (i.e., A7, A8, B7, B8, etc. . . . ). In an embodiment, a pointing finger can discriminate between multi-seat identification, or a single seat identification.

The zone determining module 46 may be used in conjunction with the actions of the effect generating module 44 and/or of the movement quantifying module 45. For example, a pointing arm from the operator may indicate a vibration of seats from the effect generating module 44, with the zone being pointed by the projection of the pointing arm interpreted by the zone determining module 46 as being only given seats being actuated to this vibration, and with the amplitude of vibration being determined by the movement quantifying module 45. As another embodiment, this interpretation may be based on separate commands from two limbs. For example, a left arm interpreted as being raised by the movement interpreting module 43 may cause a vibration, with the right arm movement and orientation used by the movement quantifying module 45 and the zone determining module 46 respectively for intensity and zone determination.

While the above description refers to a single operator, the live control unit 40 may also receive manual instructions from more than one operator. If the manual instructions are conflicting, the live control unit 40 may be programmed with a priority. As another possibility, conflicting manual instructions may cancel each other out. In an embodiment, the capture device(s) 60 are for one operator, and the user interface 70 for another. The other operator may not necessarily be on scene.

Therefore, the effect generating module 44, the movement quantifying module 45 and/or the zone determining module 46 output data to the control driver module 41. The control driver module 41 produces a motion signal, with or without network addresses, for the motion controller 20 to actuate the motion platform(s) 10 based on the instructions from the operator(s).

From a general perspective, the live control unit 40 performs a method for actuating motion platforms of a multi-platform vibro-kinetic system, by: obtaining a stream of a three-dimensional model representation of an operator; monitoring the stream and interpreting at least one movement of the operator from the stream as a manual instruction for effect generation; and outputting a motion signal containing instructions for producing a vibro-kinetic effect on at least one of the motion platforms.

According to another embodiment, the live control unit 40 may also receive motion commands from a user interface 70. The user interface 70 may be an alternative or a supplement to motion detection by the capture devices 60. In the case of the user interface 70, any operator, including the on-scene operator, may give instructions to the effect generating module 44, the movement quantifying module 45 and/or the zone determining module 46.

In an embodiment, the multi-platform vibro-kinetic system of the present disclosure may, for instance, have a system for actuating motion platforms 10, for instance via processors of the motion controller 20 and/or of the live control unit 40 may obtaining movements of at least one operator, interpreting the movements of the operator and identifying from the movements an operator instruction for effect generation, and outputting a motion signal containing instructions for producing a vibro-kinetic effect on at least one of the motion platforms as a response to the operator instruction. Obtaining movements of operator(s) may include obtaining a stream of a three-dimensional model representation of an operator, capturing the movements from at least one motion sensing input device and/or generating the three-dimensional model representation of the operator. The system may obtain a motion sample(s) as a function of an interpreted type of the movements, such as from a database matching motion samples with interpreted types of movements. The system may quantify the movements of the operator, and wherein outputting the motion signal includes producing the vibro-kinetic effect proportional to the quantifying of the movements, such as by being triggered by interpreting at least one of movements as a trigger for the quantifying. Producing the vibro-kinetic effect proportional to the quantifying of the movements may entail adjusting one or more of an amplitude, a frequency, and a distance of the motion platform. The system may identify from the movements a zone of the motion platforms to which the motion signal is output as a response to the operator instruction, while motion platforms outside the zone are not actuated as a response to the operator instruction, such as by interpreting a direction of a pointing limb of the operator to identify the zone. The system may output the motion signal to a plurality of the motion platform, such as by adding a timed delay to neighbor ones of the motion platforms as a function of a physical distance between the seats (e.g., a timed delay of 300 ms to 700 ms per meter). The system may output a motion signal track to a plurality of the motion platforms, for example, in synchronicity with an audio track and/or a video track while outputting the motion signal as a response to the operator instruction. The motion signal may supersede or supplement the outputting of the motion signal track. The system may also actuate actuators of the motion platform(s) 10 with the motion signal to produce the vibro-kinetic effect (e.g., at a frequency spectral content of 0-200 Hz).

While the methods and systems described herein have been described and shown with reference to particular steps performed in a particular order, it will be understood that these steps may be combined, subdivided or reordered to form an equivalent method without departing from the teachings of the present invention. Accordingly, the order and grouping of the steps is not a limitation of the present disclosure. For example, the live control unit 40 may be connected directly to the motion platforms 10, or may incorporate in the control driver module 41 functions performed by the motion controller 20. The live control unit 40 may produce motion signals with network addresses.

The invention claimed is:

1. A system for actuating motion platforms of a multi-platform vibro-kinetic system comprising:
a processing unit; and
a non-transitory computer-readable memory communicatively coupled to the processing unit and comprising computer-readable program instructions executable by the processing unit for:
obtaining movements of at least one operator,
interpreting the movements of the operator and identifying from the movements an operator instruction for effect generation, and
outputting a motion signal containing instructions for producing a vibro-kinetic effect on at least one of the motion platforms as a response to the operator instruction.

2. The system according to claim 1, wherein obtaining movements of at least one operator includes obtaining a stream of a three-dimensional model representation of an operator.

3. The system according to claim 2, wherein obtaining movements of the operator includes capturing the movements from at least one motion sensing input device.

4. The system according to claim 3, wherein obtaining movements of the operator includes generating the three-dimensional model representation of the operator.

5. The system according to claim 1, wherein interpreting the movements of the operator includes obtaining a motion sample as a function of an interpreted type of the movements.

6. The system according to claim 5, wherein outputting a motion signal includes obtaining the motion sample from a database matching motion samples with interpreted types of movements.

7. The system according to claim 1, wherein interpreting the movements of the operator includes quantifying the movements of the operator, and wherein outputting the motion signal includes producing the vibro-kinetic effect proportional to the quantifying of the movements.

8. The system according to claim 7, wherein quantifying the movements of the operator is triggered by interpreting at least one of movements as a trigger for the quantifying.

9. The system according to claim 7, wherein producing the vibro-kinetic effect proportional to the quantifying of the movements includes adjusting one or more of an amplitude, a frequency, and a distance of the motion platform.

10. The system according to claim 1, wherein identifying from the movements an operator instruction for effect generation includes identifying from the movements a zone of the motion platforms to which the motion signal is output as a response to the operator instruction, while motion platforms outside the zone are not actuated as a response to the operator instruction.

11. The system according to claim 10, where identifying the zone of the motion platforms includes interpreting a direction of a pointing limb of the operator to identify the zone.

12. The system according to claim 1, wherein outputting the motion signal includes outputting the motion signal to a plurality of the motion platform and wherein outputting the motion signal includes adding a timed delay to neighbor ones of the motion platforms as a function of a physical distance between the seats.

13. The system according to claim 12, wherein adding a timed delay includes adding a timed delay of 300 ms to 700 ms per meter.

14. The system according to claim 1, further comprising outputting a motion signal track to a plurality of the motion platforms while outputting the motion signal as a response to the operator instruction.

15. The system according to claim 14, wherein outputting the motion signal track is output in synchronicity with an audio track and/or a video track.

16. The system according to claim 14, wherein outputting the motion signal as a response to the operator instruction supersedes or supplements the outputting of the motion signal track.

17. The system according to claim 1, further comprising actuating actuators of the at least one motion platform with the motion signal to produce the vibro-kinetic effect.

18. The system according to claim 17, wherein actuating the actuators includes actuating the actuators at a frequency spectral content of 0-200 Hz.

19. A multi-platform vibro-kinetic system comprising:
a plurality of motion platforms each having actuators to be displaceable to produce vibro-kinetic effects;
the system according to claim 1 for actuating the motion platforms.

20. The multi-platform vibro-kinetic system according to claim 19, further comprising at least one motion sensing input device for capturing movements of the operator.

* * * * *